UNITED STATES PATENT OFFICE.

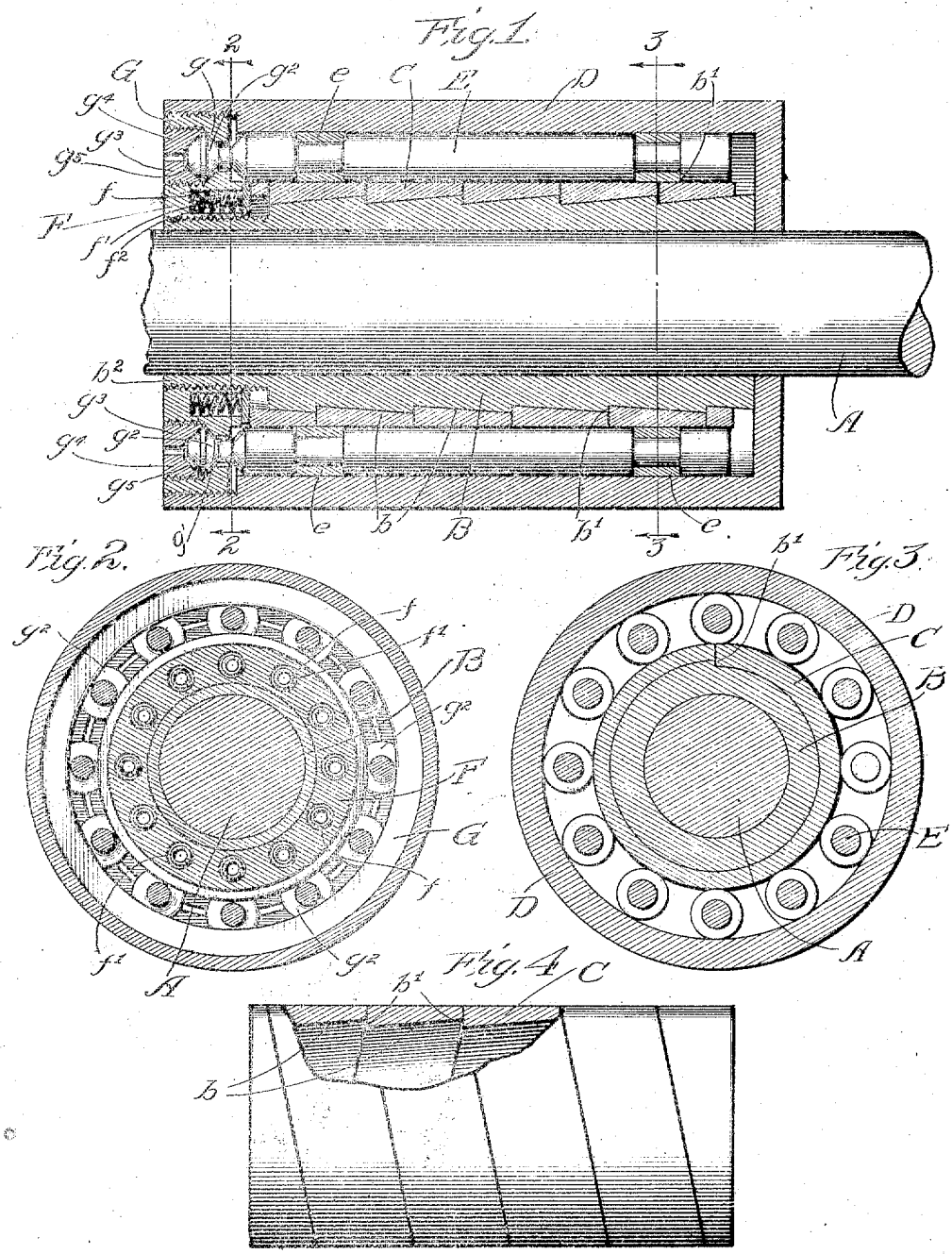

HUBERT A. MYERS, OF TOLEDO, OHIO, ASSIGNOR OF ONE-HALF TO ARTHUR S. HICKOK, OF TOLEDO, OHIO.

ROLLER-BEARING.

1,208,354.   Specification of Letters Patent.   Patented Dec. 12, 1916.

Application filed March 11, 1914. Serial No. 823,887.

*To all whom it may concern:*

Be it known that I, HUBERT A. MYERS, a citizen of the United States of America, and resident of Toledo, Lucas county, Ohio, have invented a certain new and useful Improvement in Roller-Bearings, of which the following is a specification.

My invention relates to bearings of the kind in which a helical sleeve or member is employed for taking up wear, and is in the nature of an improvement on the bearings shown and claimed in my prior applications No. 660,133 and No. 681,355.

The object of my present invention is to provide a construction and arrangement whereby the wear is automatically taken up by springs which bear against the end of the helical sleeve or member, and which keep the latter in working condition, whereby the bearing will not become loose, and is not liable to rattle, as will hereinafter more fully appear.

In the accompanying drawings—Figure 1 is a longitudinal section of a roller bearing embodying the principles of my invention. Fig. 2 is a cross section on line 2—2 in Fig. 1. Fig. 3 is a cross section on line 3—3 in Fig. 1. Fig. 4 is a side elevation of the helical sleeve or member, partly in section, by which the looseness is taken up when the bearing becomes worn.

As thus illustrated, my invention comprises an axle A having a sleeve B fixed thereon. This sleeve has a spiral bevel $b$, the convolutions of the spiral being formed integral and having a spiral shoulder $b^1$ at the inner edges thereof. The outer reduced end portion $b^2$ of said sleeve is externally threaded. A helical sleeve C, in the form of a spiral spring, is carried on the sleeve B, the inner surface of this member C being formed to fit the spiral outer surface of the sleeve B, whereby endwise movement of the member C will cause the same to expand. This, it will be seen, is because the sleeve B serves as a series of wedges, causing the convolutions of the member C to expand. Always, however, the convolutions of the member C are in tight engagement with each other, because they are made that way. The wheel hub D is of any suitable character, and rollers E are interposed between said hub and the smooth and cylindrical outer surface of the helical sleeve C, said rollers being held in relative position by rings $e$ of any suitable character. A nut F is screwed on to the end of the member B, and is provided with sockets $f$ containing springs $f^1$ that bear against a ring or washer $f^2$. Said washer $f^2$ bears against the end of the helical sleeve or member C, and consequently these springs $f^1$ keep the sleeve $c$ crowded tightly against the rollers E, thus automatically taking up wear. In other words, and when the surfaces of the rollers and the hub and sleeve surfaces upon which they travel become worn, the springs press the member C forward, thus causing it to expand and take up the wear. But, it will be understood that this action is gradual, and that the wear is taken up instantly, as fast as it occurs, whereby the bearing never becomes loose and does not rattle. And by adjusting said nut F the expansion of said springs can be taken up from time to time, thus positively holding said sleeve against endwise shift.

The hub is held against endwise displacement by a simple and effective arrangement, as follows:—A ring G having a bevel $g$ is screwed into the hub D, and a corresponding bevel $g^1$ is formed on the nut F, these being engaged by the inner beveled surfaces $g^2$ on the ends of the rollers. Rings $g^3$ and $g^4$ are screwed respectively into the elements F and G, and beveled to engage the outer surfaces of the rollers. In this way the end portions of the rollers are employed as elements of a thrust bearing to prevent endwise displacement of the wheel hub. It is obvious, of course, that the element A may be a rotary shaft, and that in such case the element D will be stationary. In other words, the helical resilient member C, which is preferably a steel spring, may be carried on either the rotary or the stationary element of a bearing. In any event, however, the springs $f^1$ serve to automatically take up wear, as the helical member C is constantly subject to the pressure of these springs.

Consequently, and as stated, the wear is taken up as fast as it occurs, thereby precluding looseness and rattle. The helical member C is so tensioned, of course, that it must be forcibly adjusted endwise, in order to cause the bevel of the spiral to expand the convolutions and take up wear. This reluctance of said member C to expand and take up wear is overcome by the coöperation of the springs $f^1$ with the angular engagement which the convolutions of said member have with the spiral bevel, so that the wear is automatically taken up to prevent looseness. Of course, however, the parts are also adjusted to positively take up the wear, as soon as any occurs, thus keeping the said springs practically always compressed to the full extent, so that they will always be in condition to take up slight wear and keep the parts perfectly tight and thus prevent rattle.

What I claim as my invention is:—

1. In a bearing, a resilient helical member having a smooth wearing surface, means for engaging said surface, said means and surface having relative movement, an element having angular engagement with said member, whereby endwise movement of the member changes the diameter thereof, to take up wear relative to said means, and a spring for pushing said member endwise, serving by expansion thereof automatically to take up wear, said bearing having provisions for adjustment to take up said expansion, said spring and helical member opposing each other by their tension, but the tension of the spring coöperating with said angular engagement to overcome the reluctance of said member to take up wear.

2. In a bearing, a resilient helical member having a smooth wearing surface, means for engaging said surface, said means and surface having relative movement, an element having angular engagement with said member, whereby endwise movement of the member changes the diameter thereof, to take up wear relative to said means, and a spring for pushing said member endwise, serving by expansion thereof automatically to take up wear, said bearing having provisions for adjustment to take up said expansion, said surface being cylindric, and said means including anti-friction rollers having parallel axes, said spring and helical member opposing each other by their tension, but the tension of the spring coöperating with said angular engagement to overcome the reluctance of said member to take up wear.

3. In a bearing, a resilient helical member having a smooth wearing surface, means for engaging said surface, said means and surface having relative movement, an element having angular engagement with said member, whereby endwise movement of the member changes the diameter thereof, to take
up wear relative to said means, and a spring for pushing said member endwise, serving by expansion thereof automatically to take up wear, said bearing having provisions for adjustment to take up said expansion, said element having a spiral bevel, and said member having the convolutions thereof formed to fit said bevel, said spring and helical member opposing each other by their tension, but the tension of the spring coöperating with said angular engagement to overcome the reluctance of said member to take up wear.

4. In a bearing, a resilient helical member having a smooth wearing surface, means for engaging said surface, said means and surface having relative movement, an element having angular engagement with said member, whereby endwise movement of the member changes the diameter thereof, to take up wear relative to said means, and a spring for pushing said member endwise, serving by expansion thereof automatically to take up wear, said bearing having provisions for adjustment to take up said expansion, a ring interposed between said spring and member, and other springs engaging said ring, said spring and helical member opposing each other by their tension, but the tension of the spring coöperating with said angular engagement to overcome the reluctance of said member to take up wear.

5. In a bearing, a resilient helical member having a smooth wearing surface, means for engaging said surface, said means and surface having relative movement, an element having angular engagement with said member, whereby endwise movement of the member changes the diameter thereof, to take up wear relative to said means, and a spring for pushing said member endwise, serving by expansion thereof automatically to take up wear, said bearing having provisions for adjustment to take up said expansion, said member being formed with the convolutions thereof in tight engagement with each other, whereby said surface is practically continuous and unbroken in character, said spring and helical member opposing each other by their tension, but the tension of the spring coöperating with said angular engagement to overcome the reluctance of said member to take up wear.

6. In a bearing, a resilient helical member having a smooth wearing surface, means for engaging said surface, said means and surface having relative movement, an element having angular engagement with said member, whereby endwise movement of the member changes the diameter thereof, to take up wear relative to said means, and a spring for pushing said member endwise, serving by expansion thereof automatically to take up wear, said bearing having provisions for adjustment to take up said expansion, and an adjustable ring for holding said spring in position, said spring and helical member opposing each other by their tension, but the tension of the spring coöperating with said angular engagement to overcome the reluctance of said member to take up wear.

Signed by me at Toledo, Ohio, this 28th day of January 1914.

HUBERT A. MYERS.

Witnesses:
ARCHIBALD H. HOOPER,
JOHN DOUBLY.